Figure 1A:
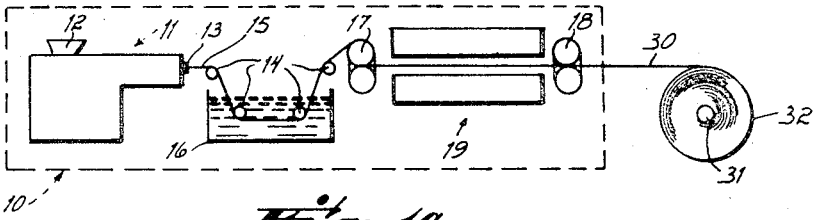
Figure 1B:
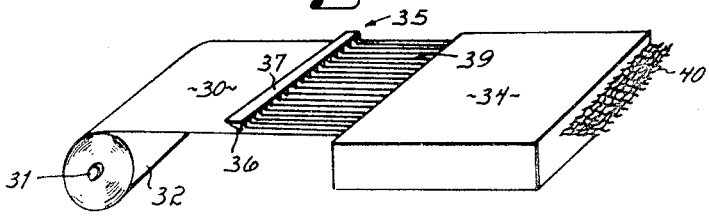
Figure 2A:
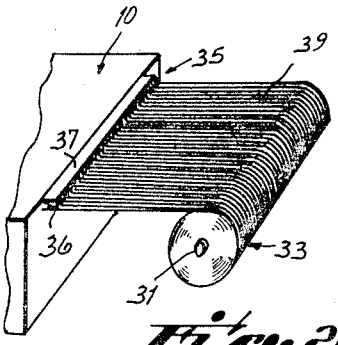
Figure 2B:
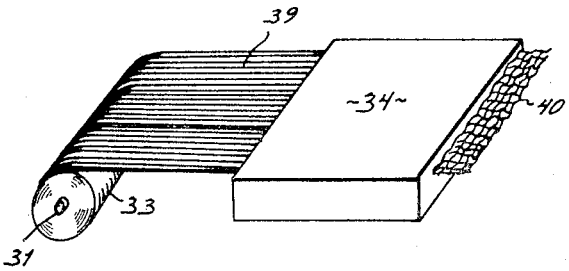
Figure 3A:
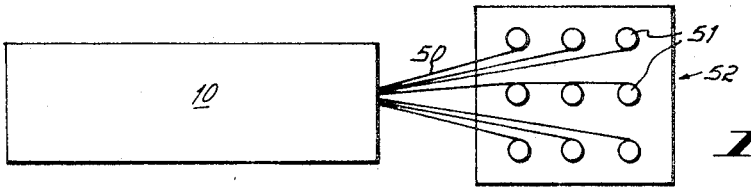
Figure 3B:
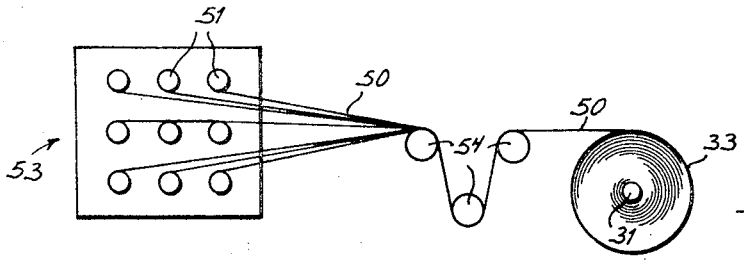
Figure 3C:
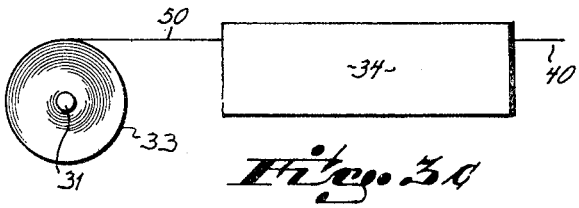

T866015

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 16, 1969

866 O.G. 701

788,681

METHOD FOR WEAVING FABRICS FROM SYNTHETIC YARN

William L. Johnson and John F. Isenberg, both of P.O. Box 511, Kingsport, Tenn. 37662

Continuation of application Ser. No. 617,342, Feb. 20, 1967. This application Dec. 23, 1968. Published Sept. 16, 1969

Int. Cl. D03d *15/00*

U.S. Cl. 28—72

1 Sheet Drawing. 13 Pages Specification

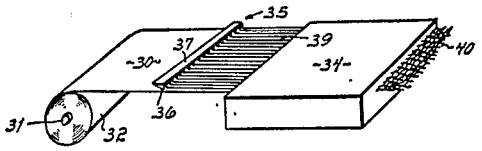

A method for weaving fabrics from ribbon-like yarn strands having the steps of extruding a crystalline thermoplastic into a film sheet, drafting and/or heat treating the film sheet to orient it in a substantially unilateral manner, winding the film sheet onto a core to form a warp beam, slitting the sheet into numerous warp yarn strands while the beam is engaged with a loom, and weaving a fabric with the slit yarn strands constituting the warp yarn of the fabric.

T866015

Sept. 16, 1969 W. L. JOHNSON ETAL 788,681 DEF. PUB.

METHOD FOR WEAVING FABRICS FROM SYNTHETIC YARN

Original Filed Feb. 20, 1967

William L. Johnson
John F. Isenberg
INVENTORS

BY William J. French
George P. Chandler
ATTORNEYS